(12) United States Patent
Bibaut

(10) Patent No.: US 8,437,888 B2
(45) Date of Patent: May 7, 2013

(54) DISTRIBUTED ARCHITECTURE FOR ALL RADIONAVIGATION AIDS

(75) Inventor: Alain Bibaut, Igny (FR)

(73) Assignee: Thales (FR)

( * ) Notice: Subject to any disclaimer, the term of this patent is extended or adjusted under 35 U.S.C. 154(b) by 575 days.

(21) Appl. No.: 12/673,816

(22) PCT Filed: Aug. 14, 2008

(86) PCT No.: PCT/EP2008/060701
§ 371 (c)(1),
(2), (4) Date: Feb. 17, 2010

(87) PCT Pub. No.: WO2009/024532
PCT Pub. Date: Feb. 26, 2009

(65) Prior Publication Data
US 2011/0022249 A1    Jan. 27, 2011

(30) Foreign Application Priority Data
Aug. 17, 2007  (FR) ...................................... 07 05886

(51) Int. Cl.
*G06F 17/00*          (2006.01)
(52) U.S. Cl.
USPC ................................................ 701/3; 701/14

(58) Field of Classification Search .................. 701/3–16, 701/36, 467–477
See application file for complete search history.

(56) References Cited

U.S. PATENT DOCUMENTS

| 6,353,779 | B1  | 3/2002 | Simon et al. |
| 6,795,408 | B1  | 9/2004 | Hiett |
| 8,250,221 | B2* | 8/2012 | Nelson et al. ................. 709/228 |
| 8,254,914 | B2* | 8/2012 | Lauer et al. .................... 455/431 |
| 2002/0045974 | A1 | 4/2002 | Heppe et al. |
| 2003/0139135 | A1 | 7/2003 | Rossi |
| 2006/0234700 | A1 | 10/2006 | Funderburk et al. |

FOREIGN PATENT DOCUMENTS

| EP | 0 789 502 A2 | 8/1997 |
| FR | 2 787 658 A1 | 6/2000 |
| FR | 2 788 922 A1 | 7/2000 |
| FR | 2 819 964 A1 | 7/2002 |

* cited by examiner

*Primary Examiner* — Richard M. Camby
(74) *Attorney, Agent, or Firm* — Baker & Hostetler, LLP

(57) ABSTRACT

The present invention relates to a distributed architecture for all aerial navigation aids. So that this architecture makes it possible to reduce the weight and/or the bulk of the cables linking the antennas to the corresponding equipment, as well as the weight and/or the bulk of at least part of said equipment, a part at least of the receivers is sited remotely in proximity to the corresponding antennas, and a part at least of the power supply for the equipment of the aircraft is centralized, and this centralized supply distributes a stabilized DC power supply to the remotely sited equipment.

6 Claims, 4 Drawing Sheets

DISTRIBUTED ARCHITECTURE FOR ALL RADIONAVIGATION AIDS

CROSS-REFERENCE TO RELATED APPLICATIONS

This application is a National Stage of International patent application PCT/EP2008/060701, filed on Aug. 14, 2008, which claims priority to foreign French patent application No. FR 07 05886, filed on Aug. 17, 2007, the disclosures of which are hereby incorporated by reference in their entirety.

BACKGROUND OF THE INVENTION

The present invention pertains to a distributed architecture for all aerial navigation aids.

To ascertain its location in flight, with respect to fixed points on the ground, an aircraft receives a certain number of signals transmitted by beacons situated at these points. These signals make it possible to designate either the distance to the fixed point, or an orientation in the horizontal plane tangent to the earth and containing this point, or an orientation with respect to its local vertical. To process these signals, the aircraft is equipped with a constellation of antennas, linked by coaxial cables to dedicated receivers, the latter being installed in an electronic rack close to the flight deck.

Represented in FIG. 1 is a simplified example of the disposition of the antennas relating to the aerial navigation aid equipment of an aircraft 1. These antennas are, in this example, those relating to the following equipment: GPS (two antennas), ADF ("Automatic Direction Finder", also with two antennas), ELT ("Energy Locator Transmitter"), VOR, ILS-GS ("ILS-Glide Slope"), ILS-LOC ("ILS Localizer"), DME-1 and DME-2 ("Distance Measuring Equipment"), MB ("Marker Beacon") and Radio-altimeter (four antennas in total, namely two for transmission and two for reception). All these antennas are linked by coaxial cables to corresponding transmitter and/or receiver equipment clustered together in the electronic rack 2.

The part of the electronic rack 2 relating to the radionavigation equipment has been schematically represented. This equipment is: the VOR-1 and 2 receivers, the DME-1 and 2 transmitters-receivers, the ILS-LOC and GS 1 and 2 receivers, the ADF 1 and 2 receivers, and the GPS 1 and 2 receivers. The digital interfaces (not represented) of these transmitters and receivers are linked by a digital bus 3 to a central computer 4. The various transmitters and receivers are linked by coaxial cables (denoted "coax" in the drawing) to the corresponding antennas.

The processing of the navigation signals by the receivers is manifested, inter alia, in the form of visual indications (dials, screens, counters, lights) and audible indications (Morse codes transmitted by the beacons and constituting their signatures).

The specific drawback of this architecture is that the electronic rack takes up a great deal of room, and that the aircraft is traversed by a large number of coaxial cables, which themselves represent a large volume and especially a significant mass. These cables are moreover expensive, since they are chosen so as to exhibit minimum losses in the transport of information and to have very effective shielding against electromagnetic disturbances.

Part of the problem can be solved by replacing the coaxial cables with links based on optical fibers, but though this makes it possible to decrease the weight and volume of the cables, it does not solve the problem of the volume of the electronic rack and requires the installation of components whose integrity level is not well known in the field of onboard aeronautics.

Another factor influencing the weight is that each receiver, today, has its own power supply, that is to say a DC/DC electrical converter making it possible to produce on the basis of the energy provided by the aircraft ($^{19}/_{37}$ $V_{DC}$) all the DC voltages ($\pm 10V$, $\pm 15V$, $\pm 5V$, $3.3V$) that are required in order to operate.

SUMMARY OF THE INVENTION

The subject of the present invention is an architecture of avionics electronic equipment comprising a system for aiding aerial navigation and, if appropriate, a system of sensors of quantities outside the aircraft and a communication system, this architecture being embedded in an aircraft comprising several antennas and sensors linked to equipment onboard the aircraft, these antennas and sensors being installed at various locations distributed over its exterior surface, this architecture having to make it possible to reduce the weight and/or the bulk of the cables linking the antennas and sensors to the corresponding equipment, as well as the weight and/or the bulk of at least part of said equipment.

The architecture in accordance with the invention is characterized in that part at least of the transmitters and/or receivers is sited remotely in or in proximity to the corresponding antennas, and in that these remotely sited transmitters and/or receivers are linked by digital links to the computer of the electronic rack.

In an advantageous manner, a part at least of the power supply for the equipment of the aircraft is centralized, and this centralized supply distributes a stabilized DC power supply to the remotely sited equipment.

BRIEF DESCRIPTION OF THE DRAWINGS

The present invention will be better understood on reading the detailed description of an embodiment, taken by way of nonlimiting example and illustrated by the appended drawing in which.

DETAILED DESCRIPTION

The solution of the invention is to remotely site at least part of the receivers in the antennas, or in proximity to the latter. These receivers communicate with the central navigation computer by digital link, this representing a negligible mass and volume with respect to the coaxials. In certain cases, this weight improvement can reach about 90%.

The electronic rack is thus freed from a significant share of the present volume, since the RF part (first stage of the receivers at the antenna output) of the receivers is generally that which takes up the greatest volume. This also makes it possible to simplify the design of the receivers since because they are no longer alongside one another, the danger of them mutually interfering is diminished.

When all the transmitters-receivers are sited remotely, the electronic rack then contains only a central computer which communicates by digital bus with all the remotely sited receivers, drives them, manages the information that they deliver so as to transmit the synthetic information required by the flight deck to the latter.

According to another characteristic of the invention, the power supply part which distributes stabilized DC power supplies to the remotely sited receivers is centralized. Indeed the power supply part of present receivers also takes up a non-negligible volume of these receivers and requires particular protection in order that the operations that it performs do not disturb the working of the remainder of the receiver. Therefore the repercussions thereof in terms of volume and mass are correspondingly reduced.

Figure 2:
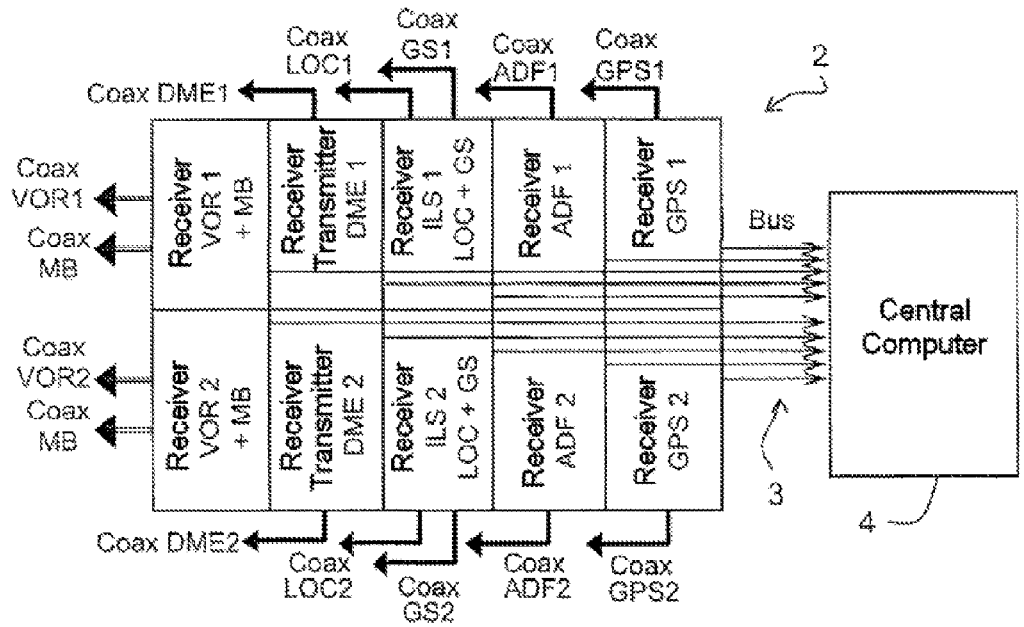
Figure 3:
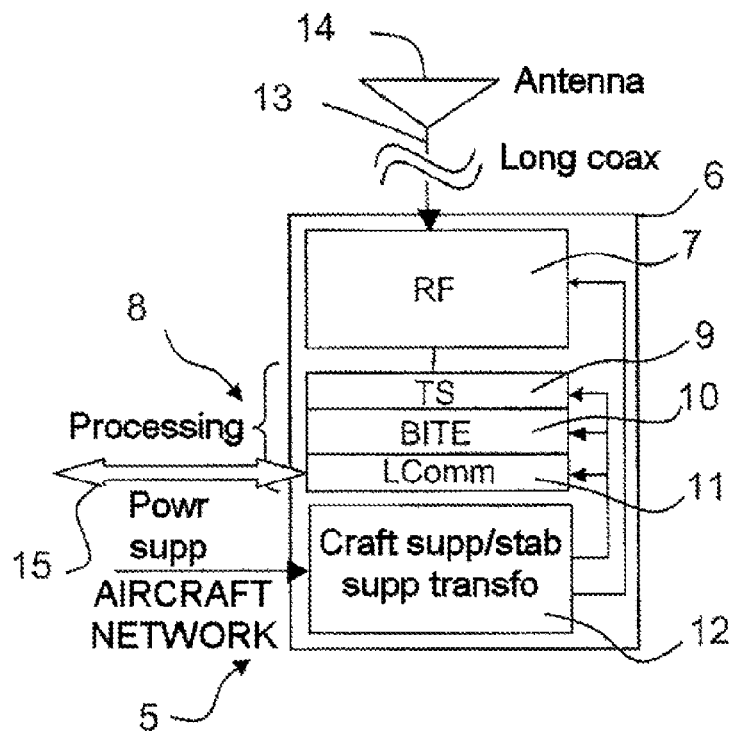
FIG. 3 is a simplified block diagram of a conventional receiver of an aircraft.

Represented in FIG. 3 is the block diagram of a conventional receiver 5, disposed in an electronic rack such as the rack 2. This receiver 5 essentially comprises, in a shielded housing 6: an RF amplifier stage 7, digital processing circuits 8 (comprising a signal processing circuit 9 as well as a "BITE" or "Built-in Test Equipment" circuit 10, that is to say an item of integrated test equipment, and a logic command and control circuit 11), and a power supply circuit 12 comprising a transformer and stabilized power supply circuits. The amplifier stage 7 is linked by a, generally long (several tens of meters), coaxial cable 13 to an antenna 14. The circuits 8 are linked by a digital bus to a central computer (such as the computer 4 of FIG. 2).

Figure 4:
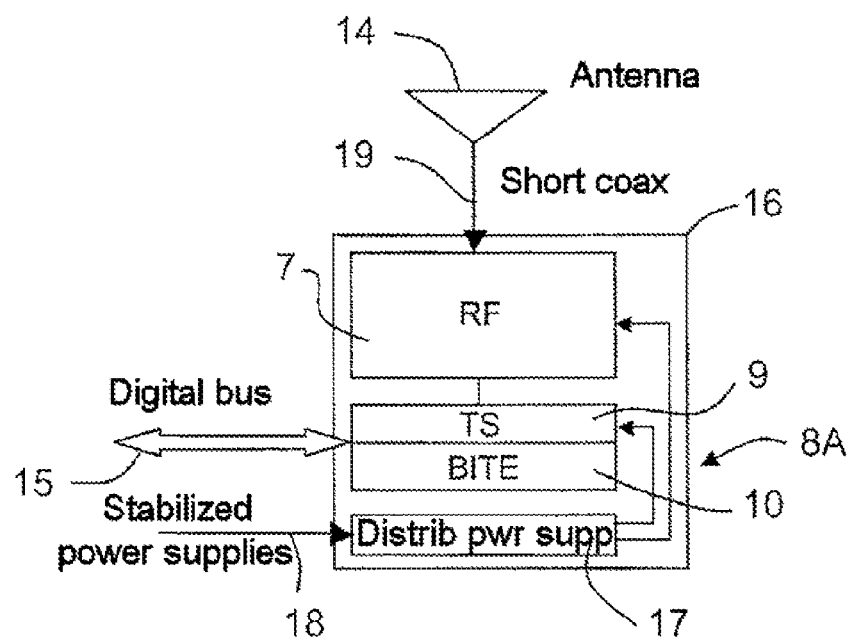
FIG. 4 is a simplified block diagram of a receiver similar to that of FIG. 3, but modified in accordance with the present invention.

Furthermore, in certain cases (ILS, VOR and DME receivers), an analog audio output of the circuit 9 is linked by an ordinary shielded cable 9A to audio circuits of the flight deck According to the invention, and as represented in FIG. 4, the receiver of FIG. 3 is disposed in a casing 16 in immediate proximity to the antenna 14 and is modified in the following manner. In this FIG. 4, the same elements as those of FIG. 3 are assigned the same numerical references. The casing 16 encloses: the RF amplifier stage 7, the digital processing circuits 8 and a DC power supply distribution circuit 17 (comprising for example DC/DC converters) supplying the circuits 7 and 8, the whole being much less bulky and much lighter than in the case of the conventional receivers such as that shown diagrammatically in FIG. 3. The circuit 17 is linked by an ordinary shielded cable 18 to the stabilized DC general power supply circuit (described below with reference to FIG. 5) of the electronic rack of the aircraft (rack similar to the rack 2 of FIG. 1). Unlike the case of FIG. 3, the digital processing circuits 8A comprise only the signal processing circuit 9 and the "BITE" circuit 10, the logic circuit 11 of the receiver of FIG. 3 then being replaced with a central logic circuit, described below with reference to FIG. 3. As in the case of FIG. 3, the circuits 8A are linked by the digital bus 15 to the central computer. The RF amplifier stage 7 is linked by a very short coaxial cable 19 (for example a few centimeters or a few tens of centimeters long) to the antenna 14. In an advantageous manner, the digital bus 15 can be an optical bus.

As a variant, the remotely sited receivers can be integrated into the antennas (which are then of the "smart antennas" type). At present, an antenna of this type is protected by a radome fixed to the "skin" of the aircraft, outside the aircraft, and is linked by a very short coaxial cable (for example a few centimeters in length) to a decentralized module termed "INM" ("Integrated Navigation Module") disposed inside the aircraft's "skin", very near the latter, this module being linked by a digital bus to the centralized corresponding receiver.

Figure 5:
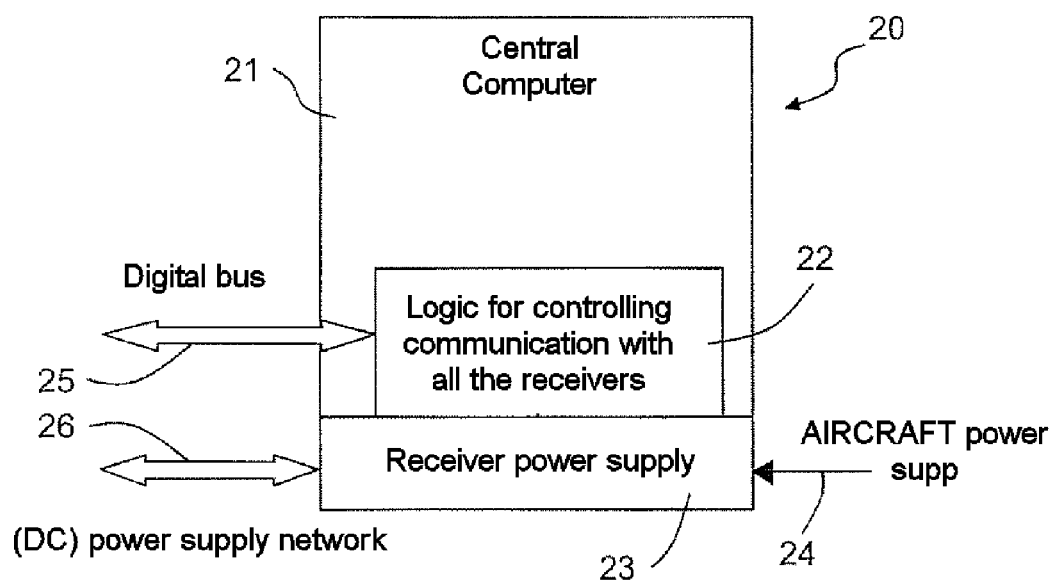
FIG. 5 is a simplified block diagram of an aircraft equipment rack, in accordance with the present invention.

Represented schematically in FIG. 5 is an exemplary embodiment of the part of the aircraft's electronic rack relating to radionavigation and to the sensors of quantities outside the aircraft, this rack part being such as resulting from the transformation of all the receivers in accordance with the invention (these receivers being the same as the receiver of FIG. 4). This rack 20 essentially comprises: the central computer 21, a central logic circuit 22 for control and communication with all the remotely sited receivers, and a centralized power supply device 23 for the remotely sited receivers. The logic circuit 22 is linked by a digital bus 25 to all the remotely sited receivers. The power supply device 23 receives through a cable 24 the main power supply for the aircraft and distributes via a line 26 a stabilized DC power supply to all the remotely sited receivers. Thus, the volume and the weight of the supply device for powering the radionavigation receivers is significantly decreased because the individual power supply devices for the receivers (which comprised for each centralized receiver its own stabilized power supply and its own transformer) are replaced with a single power supply device supplying all the remotely sited receivers. Furthermore, the risks of disturbances which were liable to be caused by the power supply devices (12) of the receivers of the prior art are decreased.

Figures 6, 7:
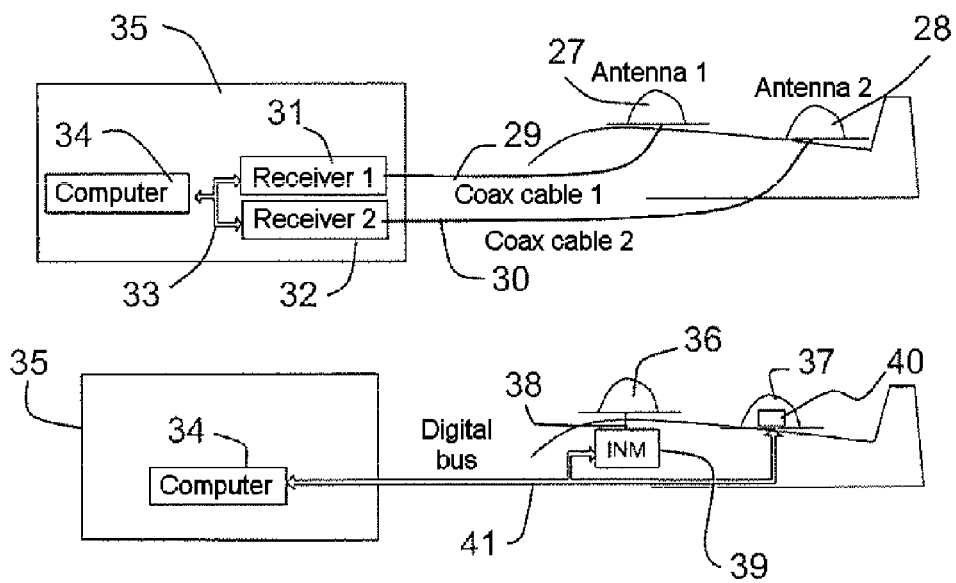
FIG. 6 is a very simplified diagram of a part of an aircraft radionavigation installation of the prior art.
FIG. 7 is a very simplified diagram of a part of an aircraft radionavigation installation in accordance with the invention.

The difference between a radionavigation installation of the prior art and an installation in accordance with the invention has been illustrated with the aid of FIGS. 6 and 7, respectively.

Only two antennas 27 and 28 (and more precisely the radomes enclosing these antennas) of a radionavigation system have been represented in FIG. 6, these antennas being respectively linked by individual coaxial cables 29, 30 to a corresponding individual receiver 31, 32. The digital outputs of these receivers are linked by a bus 33 to the computer 34 of the rack 35 (which can be the rack 2 of FIG. 1) of the aircraft. As specified above, this known architecture exhibits the drawback of requiring as many coaxial cables as there are antennas (or sensors of physical quantities), the number of which may be high, as shown diagrammatically in FIG. 1. The cables, such as 29 and 30, are long for the most part and their weight is therefore too great for an aircraft, or at the very least far from being negligible.

Shown diagrammatically in FIG. 7 is a part of an architecture in accordance with the invention, with two different embodiments of receivers and associated antennas, represented in the same figure. These antennas, with their radomes, are referenced 36, 37. The antenna 36 is linked by a very short coaxial cable 38 (for example about ten centimeters long) to a receiver 39, here dubbed "INM" ("Integrated Navigation Module"), disposed inside the aircraft's "skin", very near the latter, this receiver being such as that of FIG. 4. The antenna 37 is of the type with integrated receiver, that is to say its associated receiver 40 (having the same architecture as that of FIG. 4) is integrated into the radome of the antenna. Of course, this is possible only if the receiver 40 is designed to operate at very low temperatures, such as may obtain at high altitude, for example of the order of −60° C. It is also understood of course that the aircraft will generally be furnished either with receivers of the type of the receiver 39, or of the type of the receiver 40.

Figure 1:
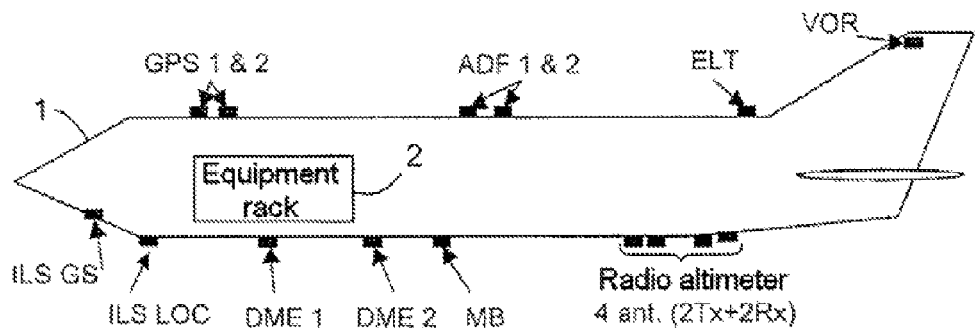
FIG. 1, already described above, is a very simplified diagram showing an exemplary location of antennas of a conventional civilian aircraft, FIG. 2, already described above, is a partial block diagram of a rack of electronic equipment of an aircraft such as that of FIG. 1.

All the receivers of the radionavigation system, such as the receiver 39 (or 40) are linked to a digital bus 41, itself linked to the computer control logic 34 of the rack 35, this logic and the computer being for example those represented in FIG. 5, and the rack 35 being similar to the rack 2 of FIG. 1.

It is thus noted that the architecture of FIG. 7 exhibits lesser complexity than the conventional architecture of FIG. 6, and especially much smaller weight and bulk than in the conventional architecture, by virtue, in particular, of the use of digital buses in place of coaxial cables.

The invention claimed is:

1. A distributed architecture for all the aerial navigation aids of an aircraft, wherein a part at least of the transmitters and/or receivers is sited remotely in proximity to the corresponding antennas, and in that these remotely sited transmitters and/or receivers are linked by digital links to the computer of the electronic rack of the aircraft, wherein a part at least of the power supply for the equipment of the aircraft is centralized, and wherein this centralized supply distributes a stabilized DC power supply to the remotely sited equipment.

2. A distributed architecture for all the aerial navigation aids of an aircraft, wherein a part at least of the transmitters and/or receivers is sited remotely in proximity to the corresponding antennas, and in that these remotely sited transmitters and/or receivers are linked by digital links to the computer of the electronic rack of the aircraft, wherein the digital links are optical buses.

3. The architecture as claimed claim 1, wherein at least part of the whole set of transmitters and/or receivers is integrated into the corresponding antenna.

4. The architecture as claimed claim 2, wherein at least part of the whole set of transmitters and/or receivers is integrated into the corresponding antenna.

5. A distributed architecture for all aerial navigation aids of an aircraft comprising:
   transmitters and receivers;
   a computer associated with an electronic rack; and
   antennas corresponding to the transmitters and receivers,
       wherein a part of at least one of the transmitters and receivers is sited remotely in proximity to the corresponding antennas, wherein the part of at least one of the transmitters and receivers sited remotely in proximity to the corresponding antennas are linked by digital links to the computer associated with the electronic rack of the aircraft, and wherein the digital links comprise optical buses.

6. The architecture as claimed claim 5, wherein the part of at least one of the transmitters and receivers is integrated into the corresponding antenna.

\* \* \* \* \*